Nov. 20, 1962

R. J. MELTZER 3,064,523

ILLUMINATING ARRANGEMENT FOR OPTICAL DEVICES

Filed Feb. 24, 1960

INVENTOR.
ROBERT J. MELTZER
BY Frank C. Parker
Hoffman Stone
ATTORNEYS

United States Patent Office 3,064,523
Patented Nov. 20, 1962

3,064,523
ILLUMINATING ARRANGEMENT FOR OPTICAL DEVICES
Robert J. Meltzer, Irondequoit, N.Y., assignor to Bausch & Lomb Incorporated, a corporation of New York
Filed Feb. 24, 1960, Ser. No. 10,790
1 Claim. (Cl. 88—24)

This invention relates to an improved illuminator for optical devices such as microscopes, contour projectors, and the like, and more particularly, but not necessarily exclusively, to an improved arrangement for projecting light outwardly through the viewing objective lens of an optical device for illuminating an object under observation.

One important object of the present invention is to provide an improved arrangement for episcopic illumination in an optical device.

Other objects are: to provide an improved episcopic illumination system which does not include beam splitters or other elements that curtail the light transmitting efficiency of the optical system to an appreciable extent; to provide an improved light directing system for use in connection with optical apparatus, in which light is projeted into the apparatus from one side and directed along the principle optical axis of the apparatus for illuminating an object being viewed; to provide an improved arrangement of this type including a refracting member for directing illuminating light rays along the optical axis of the apparatus; to provide an improved arrangement of this type wherein the refracting member is apertured and defines an optical stop in the apparatus; and in general to provide an episcopic illuminating system for use in optical devices, which is relatively simple and inexpensive to manufacture, and which may be relatively easily and quickly positioned in the optical device without the need to use high precision measuring apparatus.

Figure 1:
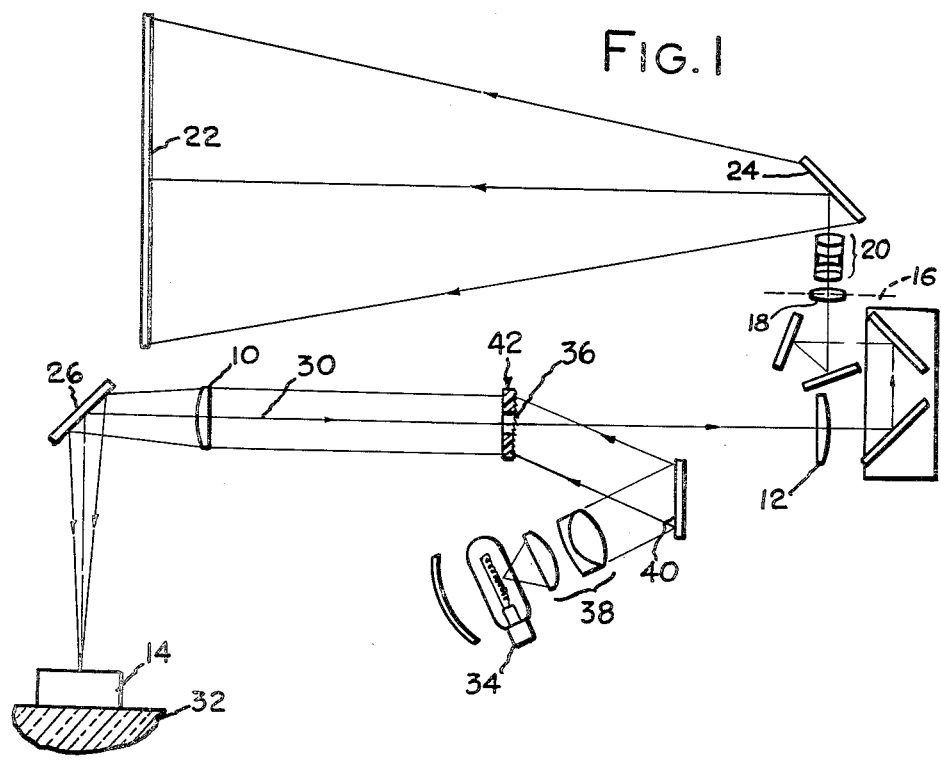
Figure 2:
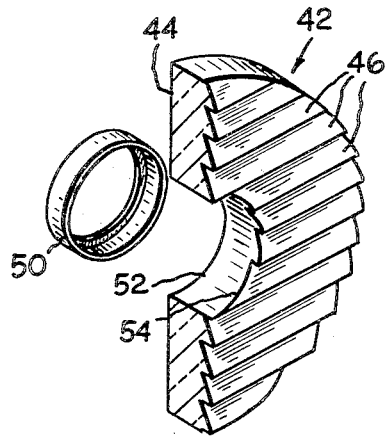

The foregoing and other objects and advantages of the present invention will become apparent in the following detailed description of a representative embodiment thereof, taken in conjunction with the drawings, wherein:

FIG. 1 is a schematic diagram of the optical system of a contour projector including an episcopic illuminating arrangement according to the present invention; and FIG. 2 is a fragmentary, perspective view of the refractive element of the episcopic illuminating system shown in FIG. 1.

Episcopic illuminating systems of the type that include beam splitters are generally undesirable for use in optical instruments such as, for example, projection microscopes in which it is relatively difficult to provide adequate object and image illumination. Beam splitter arrangements usually involve the sacrifice of relatively large proportions of the available light either in the imaging or in the illuminating beam or in both. Different arrangements have heretofore been proposed for overcoming, at least to some extent, the light attenuation problem in episcopic illumination systems. One such arrangement for example, is shown by Turner and Kingslake in their United States Patent #2,552,238, in which they describe a contour projector, or projection microscope having a telecentric afocal relay system. They provide episcopic illumination for the projector by positioning a relatively intense light source at one side of the optical axis of the relay system, directing light from the light source toward the optical axis perpendicularly thereto, where it is intercepted by an inclined mirror positioned at the optical stop of the relay system. The mirror is apertured to define the stop and is inclined at about 45° to the optical axis so that it reflects the light directed upon it from the light source toward the front objective lens of the afocal system. This arrangement has the advantages of offering minimum masking of the image rays, and maximizing the transmission of the illuminating rays toward the object being viewed. The arrangement suffers from the disadvantage that the position of the mirror is so critical with respect to the relay system that it is not possible to remove it and replace it without the use of highly precise instruments such as are usually available only in a well equipped laboratory. Therefore, if for any reason it becomes desirable to remove the mirror for cleaning, it is usually necessary to return the entire instrument to its original manufacturer so that the position of the mirror in the system can be properly checked before the instrument is returned to service.

This disadvantage is overcome according to the present invention without sacrificing the advantages of the Turner and Kingslake system by using in place of the mirror a prismatic refracting element, which may be positioned generally perpendicularly to the optical axis of the device in which the system is incorporated. The refractive element in the arrangement according to the present invention is much less critical with respect to its position than is the reflector proposed by Turner and Kingslake, so that the refractive element may be removed in the field and replaced even by relatively unskilled personnel without the use of precision positioning devices and without danger of adversely affecting the accuracy or efficiency of the instrument.

The practice of the invention is applicable to many different kinds of optical devices wherein it is desired to project a light beam for illumination purposes along a selected axis of the device, and particularly where it is desired to project the light in one direction along the axis without adversely affecting the quantity or quality of light traveling in the opposite direction. The invention came about during the development of a projection microscope, or contour projector, and is described herein in connection with a device of this character, but this is not to be understood as limiting in any way the applicability of the invention to optical devices of different nature.

Referring now to the drawing, the optical system illustrated in FIG. 1 is designed for a contour projector, and includes a telecentric afocal relay system having a front objective lens 10 and a rear objective lens 12, which are spaced apart a distance equal to the sum of their focal lengths. The afocal system projects an aerial image of the object 14 being viewed onto a field lens 18, which is positioned at an internal image plane 16. An objective lens 20 projects the image from the image plane 16 to a view screen 22 by way of an inclined mirror 24.

As shown, the projector is arranged for vertical viewing of the workpiece 14 by way of a mirror 26 positioned in front of and in alignment with the front objective 10 at an angle of 45° to the optical axis 30 of the afocal system. The workpiece may be supported upon a glass stage 32, and for profile viewing, a light source (not shown) is positioned beneath the stage 32 for directing light upwardly through the stage 32 and past the workpiece 14. In many cases, however, it is desired to illuminate the upper surface of the workpiece 14, and for maximum efficiency in this type of illumination, it is desirable to project the illuminating light through the front objective 10 of the projector.

Toward this end, a light source, which may be in the form of an electric lamp 34 is mounted in the contour projector housing (not shown) or adjacent thereto, and any convenient or other desired arrangement is provided for directing light from the lamp 34 toward the stop 36 of the afocal system at a predetermined angle relative to the optical axis 30. In the arrangement shown, a collimating lens 38 directs light from the lamp 34 rearwardly toward a plano mirror 40, which reflects the light toward the stop 36 at an angle of about 30° from the axis 30.

According to the invention, a prismatic refracting element 42 is positioned at the stop 36 for refracting the light directed toward it from the mirror 40, and redirecting the light along paths closely paralleling the optical axis 30 toward the front objective 10. As shown, the refracting element 42 is of echleon form, being flat on one surface 44 and having its opposite surface formed in the shape of a plurality of saw tooth ridges 46, the crests, or apices, of which all lie approximately in the same plane. The element 42 may be regarded as a prism having a form analogous to a Fresnel lens, and it will be referred to hereinafter as a Fresnel prism, or an echelon prism. The prism angle is selected in view of the angle of the illuminating light reaching the prism from the mirror 40 to refract the illuminating light and direct it into a path parallel to the optical axis 30, taking into account also the refractive index of the material of which the prism 42 is made. This computation is well within the skill of those versed in the art and need not be described in detail herein.

The light source 34 is relatively large so that there is adequate "smear" to mask the dispersion effect of the Fresnel prism. No color is introduced into the system by the Fresnel prism 42. If desired, an aperture ring 50 may be inserted within the central aperture 52 of the Fresnel prism to provide a smooth circular aperture and avoid illumination gradients such as may be occasioned by the irregular form of the rear edge 54 of the prism aperture 52.

The Fresnel prism is preferably arranged to work at approximately its minimum deviation angle so that relatively small errors or changes in its position will have no noticeable effect on the angle of the illuminating light emerging from it. This permits the removal and replacement of the Fresnel prism in the field by relatively unskilled personnel, and without the use of high precision positioning equipment.

The Fresnel prism 42 may be made of any desired transparent material such as, for example, quartz, glass, or plastic. For ease of manufacture by molding, plastic is a preferred material. However, for maximum durability and resistance to aging glass is preferred.

What is claimed is:

In a contour projector or the like for projecting an image of an object, the combination of a telecentric afocal optical relay system consisting of a front objective lens and a rear objective lens which have substantially equal focal lengths and are spaced apart by the sum of their focal lengths, said system forming an aerial image of said object, means forming a telecentric stop which is located in a plane extending through the common focal point of said lenses and normal to the axis of said optical system, an image receiving screen optically aligned rearwardly of said optical relay system, an objective lens which is optically aligned between said aerial image and said screen to project the image upon the screen, and illuminating means for episcopically illuminating said object, said means consisting of an echelon prism formed on one side of a transparent plate and located in said plane so as to receive incident light rays at an acute angle to the optical axis of said relay system and direct said rays through said front objective lens upon said object; said telecentric stop being formed in said plate, said illuminating means further consisting of a light source and light condensing means operatively associated with the source to direct light rays toward said prism at said angle.

References Cited in the file of this patent

UNITED STATES PATENTS

| | | |
|---|---|---|
| 2,216,003 | Eppenstein et al. | Sept. 24, 1940 |
| 2,552,238 | Turner et al. | May 8, 1951 |
| 2,552,280 | Hudak | May 8, 1951 |
| 2,818,765 | Foster | Jan. 7, 1958 |